(12) United States Patent
Himmelstoss et al.

(10) Patent No.: US 8,823,582 B2
(45) Date of Patent: Sep. 2, 2014

(54) FMCW RADAR SENSOR SYSTEM HAVING A DEVICE FOR DETECTING A RADOME COATING

(75) Inventors: Armin Himmelstoss, Weissach Im Tal (DE); Stefan Heilmann, Vaihingen/Enz (DE); Joachim Hauk, Renningen-Malmsheim (DE); Elisabeth Hauk, legal representative, Renningen-Malmsheim (DE); Rahel Hauk, legal representative, Renningen-Malmsheim (DE); Manuel Hauk, legal representative, Renningen-Malmsheim (DE); Goetz Kuehnle, Hemmingen (DE); Dirk Bechler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 526 days.

(21) Appl. No.: 13/201,293

(22) PCT Filed: Dec. 28, 2009

(86) PCT No.: PCT/EP2009/067946
§ 371 (c)(1),
(2), (4) Date: Dec. 15, 2011

(87) PCT Pub. No.: WO2010/097138
PCT Pub. Date: Sep. 2, 2010

(65) Prior Publication Data
US 2012/0268317 A1    Oct. 25, 2012

(30) Foreign Application Priority Data

Feb. 27, 2009  (DE) .......................... 10 2009 001 231

(51) Int. Cl.
*G01S 7/40* (2006.01)
*G01S 13/34* (2006.01)
*H01Q 1/42* (2006.01)

(52) U.S. Cl.
CPC ............... *G01S 7/4004* (2013.01); *G01S 13/34* (2013.01); *H01Q 1/42* (2013.01)
USPC ........................... 342/128; 342/173; 342/196

(58) Field of Classification Search
CPC .......... G01S 7/4004; G01S 13/34; H01Q 1/42
USPC .......... 342/118, 124, 128, 173–174, 192, 196
See application file for complete search history.

(56) References Cited

U.S. PATENT DOCUMENTS 5,371,505 A * 12/1994 Michaels ...................... 342/360
5,485,159 A * 1/1996 Zhang et al. .................. 342/165
6,348,889 B1 * 2/2002 Ashihara et al. ................ 342/70

(Continued)

FOREIGN PATENT DOCUMENTS

DE         199 29 794          1/2000
DE    102009001231 A1 *    9/2010

(Continued)

*Primary Examiner* — John B Sotomayor
(74) *Attorney, Agent, or Firm* — Kenyon & Kenyon LLP

(57) ABSTRACT

An FMCW radar sensor system is described having an antenna covered by a radome, a mixer for mixing a frequency-modulated transmission signal with a signal received by the antenna, a device for recording the mixed product of the mixer as a time-dependent signal, a device for calculating the spectrum of the time-dependent signal, and a device for detecting a reflecting coating on the radome, characterized in that the device for detecting the reflecting coating is configured for analyzing the time-dependent signal and for determining the extent of reflection on the radome based on the amplitude of this signal.

2 Claims, 2 Drawing Sheets

(56) References Cited

U.S. PATENT DOCUMENTS

| | | |
|---|---|---|
| 7,342,532 B1 | 3/2008 | Matsuoka |
| 7,486,222 B2 * | 2/2009 | Matsuoka ................ 342/70 |
| 2002/0075178 A1 | 6/2002 | Woodington et al. |
| 2007/0085728 A1 * | 4/2007 | Matsuoka ................ 342/70 |
| 2012/0032838 A1 * | 2/2012 | Heilmann et al. ......... 342/192 |
| 2012/0268317 A1 * | 10/2012 | Himmelstoss et al. ....... 342/192 |

FOREIGN PATENT DOCUMENTS

| | | |
|---|---|---|
| EP | 1 980 874 | 10/2008 |
| EP | 2401633 B1 * | 4/2013 |
| WO | WO 2010097138 A1 * | 9/2010 |

* cited by examiner

FMCW RADAR SENSOR SYSTEM HAVING A DEVICE FOR DETECTING A RADOME COATING

CROSS-REFERENE TO RELATED APPLICATIONS

This application is a national stage application of International Application No. PCT/EP2009/067946, filed Dec. 28, 2009, which claims priority to German Application No. 10 2009 001 231.1, filed Feb. 27, 2009, which is incorporated by reference in its entirety.

FIELD OF THE INVENTION

The present invention relates to an FMCW radar sensor system having an antenna covered by a radome, a mixer for mixing a frequency-modulated transmission signal with a signal received by the antenna, a device for recording the mixed product of the mixer as a time-dependent signal, a device for calculating the spectrum of the time-dependent signal, and a device for detecting a reflecting coating on the radome.

BACKGROUND INFORMATION

FMCW radar sensor systems are believed to be used in driver assistance systems for motor vehicles, for example, for an automatic distance regulation or for early detection of the risk of a collision. The radome, which covers the antenna and is usually formed by a radar lens, is exposed to weather conditions and road dirt to a particularly high degree, so that a lossy, reflecting dielectric coating (dirt or water film) may easily be formed on the radome.

This is believed to significantly reduce the transmission and reception performance of the radar sensor, so that the locating depth and locating reliability are substantially limited and the radar sensor may even be entirely blinded. For example, at a radar frequency of 76.5 GHz, a 0.3 mm thick water film on the radome causes approximately 50% of the emitted power to be reflected on this water film and approximately 90% of the residual power is attenuated by absorption.

For purposes of traffic safety it is important that a blinding or limitation of the function of the radar sensor system can be detected as immediately as possible.

The functional principle of an FMCW radar sensor system (frequency modulated continuous wave) is that the radar signal is sent continuously; however, the frequency of this signal is modulated periodically using up and down ramps. The mixer mixes a portion of the transmission signal with the signal received from the antenna and thus produces a mixed product, the frequency of which corresponds to the difference between the frequency of the instantaneous transmission signal and the frequency of the received signal.

When a radar echo is received from a located object, the frequency of the mixed product is thus a function of the signal transit time and accordingly the distance of the object but also of the relative velocity of the reflecting object due to the Doppler Effect. Each located object therefore emerges in the spectrum formed from the time-dependent signal and the mixed product on each modulation ramp as a peak in the frequency depending on the distance and the relative velocity. By comparing the frequency positions of peaks—originating from the same object—on modulation ramps having a varying gradient, it is possible to determine the distance and the relative velocity of the object.

A reflecting coating on the radome may be seen as an "object" which has the relative velocity of zero and the distance of which corresponds to the distance between the antenna and the radome. This distance is typically of a size of approximately 2-6†cm; however, it may also be larger, for example, if the radar sensor is installed covered in the vehicle, such as behind a bumper which then forms the radome which may be susceptible to coating. However, the sensor system is generally designed for locating objects, the distance of which is between approximately 0.5 m and approximately 250†m, i.e., many times greater than the distance between the antenna and radome. When the object distance approaches zero at a relative velocity of zero, the frequency of the time-dependent signal also tends toward zero, and the period of this signal is consequently large in relation to the duration of the modulation ramp. The result of this is that it is not possible to determine such small frequencies with adequate accuracy. The peak, which would have been caused by the radome coating, is therefore outside of the evaluable range of the spectrum and can thus not be used for detecting the radome coating in conventional radar sensor systems.

A method for detecting a radome coating is discussed in EP 1 980 874 A2, which is based on the fact that the signal reflected on the radome results in a shift of the operating point of the mixer. By comparing the instantaneously measured mixer operating point with the mixer operating point in a coating-free radome, it is therefore possible to detect a radome coating.

Since, however, the mixer operating point for the coating-free radome depends on the respective installation tolerances during the installation of the radar sensor, the mixer operating point must be measured elaborately in several discrete frequencies within the allowed frequency range. Moreover, the result is falsified due to the fact that the mixer operating point is temperature-dependent and is also subject to aging influences. In order to mitigate these influences, the mixer operating point-reference curve must be constantly relearned, which limits the suitability of the radar sensor system for serial production, particularly due to the fact that it is difficult to ensure that the radome is actually coating-free when the reference curve of the mixer operating point is recorded or learned.

SUMMARY OF THE INVENTION

An object of the exemplary embodiments and/or exemplary methods of the present invention is to provide an FMCW radar sensor system which makes it possible to detect a radome coating more simply and more reliably.

According to the exemplary embodiments and/or exemplary methods of the present invention, this objective is achieved in that the device for detecting the reflecting coating is designed for analyzing the time-dependent signal and for determining the extent of the reflection on the radome based on the amplitude of this signal.

The spectrum of the time-dependent signal is thus not used for detecting the radome coating as in the case of other objects, but instead the time-dependent signal itself is used. If no other objects are present and only reflections from the radome are received, the time-dependent signal received as a mixed product is approximately a sinusoidal signal having a characteristic frequency which is determined and thus known using the known distance between the antenna and the radome (approximately 6 cm) and the relative velocity of zero. Even if the time window available for the evaluation of this signal, which may not be greater than the duration of the modulation ramp, is significantly smaller than a complete wavelength of the sinusoidal signal, it is possible to determine the amplitude of the sinusoidal signal from the curve of this signal within the time window, since the frequency is known. This amplitude directly provides information concerning the strength of the reflection occurring on the radome and thus makes it possible to quantitatively determine the adverse effect on the transmission and reception performance. It is in particular possible to emit a signal that indicates the blinding of the sensor system if the amplitude exceeds a specific threshold value depending on the power of the signal emitted by the antenna.

If additional objects are located at distances of several meters or more, the result is that frequency components are superimposed on the evaluated sinusoidal signal, the frequencies of which are greater by at least a factor of 100 and may thus be eliminated if necessary via low pass filtering.

The exemplary embodiments and/or exemplary methods of the present invention offer the advantage that the detection of the radome coating by direct evaluation of the time-dependent signal at the mixer output requires a comparatively low expense for equipment and computational complexity. In addition, the susceptibility to temperature fluctuations and aging effects is significantly improved, making the blindness detection more reliable and more robust. The radome coating may be detected very rapidly using the sensor system according to the present invention, for example, in time periods of less than 1 second, and moreover independent of installation tolerances.

One exemplary embodiment of the invention is shown in the drawings and explained in greater detail in the following description.

DETAILED DESCRIPTION

Figure 1:
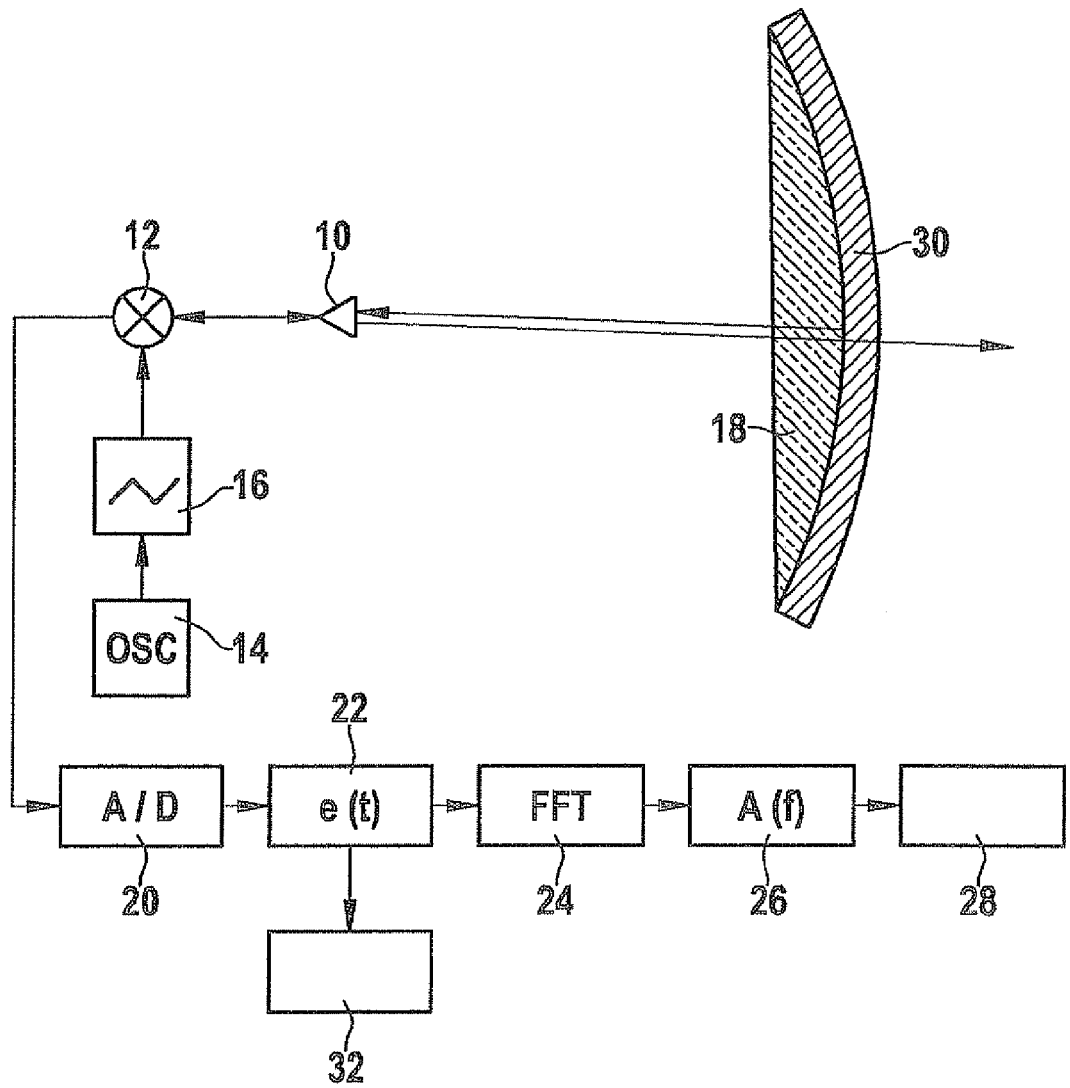
FIG. 1 shows a block diagram of the radar sensor system according to the present invention.

The radar sensor system shown in FIG. 1 has an antenna 10 to which a transmission signal generated by an oscillator 14 and frequency modulated by a modulator 16 is fed via a mixer 12. The signal emitted by antenna 10 is bundled by a radar lens which in this case is simultaneously a radome 18 for covering the antenna and accordingly for protecting the antenna against weather conditions.

As soon as the radar sensor system locates an object (not shown), the lens bundles the signal reflected on the object back to the same antenna 10 that emitted the transmission signal (monostatic antenna concept). The received signal is mixed with a component of the transmission signal in mixer 12 and a time-dependent signal (intermediate frequency signal) which is sampled and digitized in an analog/digital converter stage 20 is obtained as the mixed product. In this way, a time-dependent signal 22 is obtained which indicates the curve of elongation e(t) over time of the mixed product. In a converter stage, time-dependent signal 22 is, for example, converted by a Fast Fourier Transformation (FFT) 24 into a spectrum 26, which indicates the dependence of the amplitude of the mixed product on frequency f. In an evaluation stage 28, this spectrum is evaluated further to determine the distances and relative velocities of the located objects and—in the case of multi-beam radar—their azimuth angle as well.

A coating 30, for example, a water film or a dirt film, is shown exaggeratedly on the surface of radome 18 in FIG. 1, the coating reflecting a portion of the radar beam emitted by antenna 10 and absorbs a further portion of the radar beam allowed through. Coating 30 is thus capable of substantially reducing the sensitivity of the radar sensor system and even completely blinding it.

For that reason, the radar sensor system has a detection unit 32 that makes it possible to detect the presence of reflecting coating 30 within a short time and evaluate the reflectivity of this coating quantitatively. To this end, detection unit 32 evaluates time-dependent signal 22.

Figure 2:
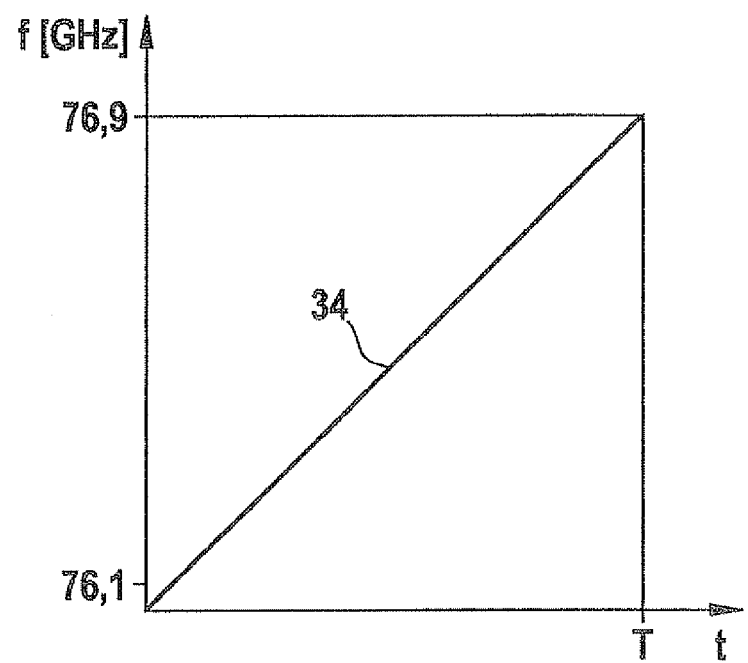
FIG. 2 shows a time-frequency chart of a transmission signal of the radar sensor system.

Modulator 16 modulates the transmission signal in a ramped manner including an alternating sequence of rising and falling modulation ramps. In FIG. 2, curve 34 shows a single modulation ramp having a duration T and a modulation amplitude of 0.8 GHz.

Figure 3:
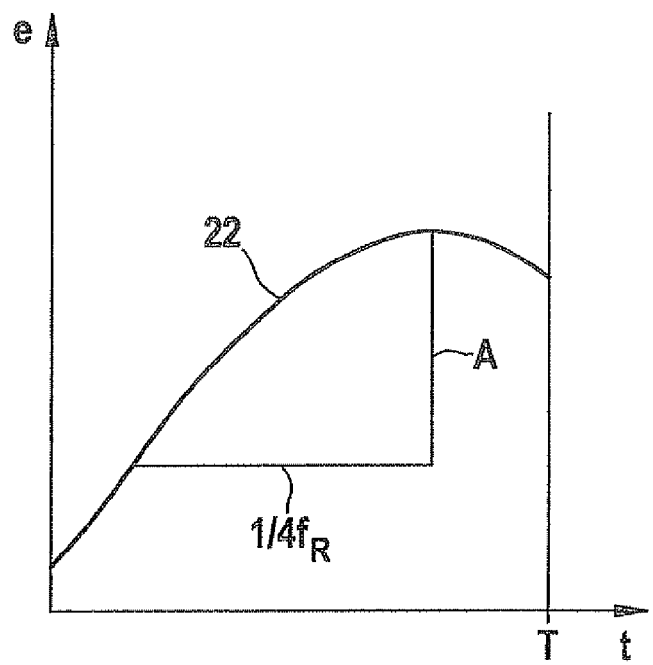
FIG. 3 shows a time-elongation chart of a time-dependent signal which is obtained at a mixer output in the sensor system.

If the transmission signal modulated in this manner is mixed in mixer 12 with the signal reflected on coating 30, time-dependent signal 22 obtained as the mixed product has a sine curve as shown in FIG. 3 and its frequency $f_R$ may be calculated according to the following formula:

$$f_R = 2*d*F/(c*T).$$

In this formula, d is the distance between antenna 10 and the surface of radome 18 on which coating 30 is located; F is the modulation amplitude, T is the modulation duration and c is the speed of light. Since coating 30 has a relative velocity of zero in relation to antenna 10, the formula provided above has no Doppler term.

Due to the small distance between the antenna and the radome, frequency $f_R$ is relatively small, and its period $1/f_R$ is greater than modulation duration T. Consequently, no complete sinusoidal wave is seen in FIG. 3 but instead only a portion of a sinusoidal wave. In the example shown, modulation amplitude F and modulation duration T are selected in such a way that this portion corresponds to approximately 0.32 periods of the time-dependent signal. This portion may amount to at least 0.125 periods.

In the example shown in FIG. 3, the visible portion of the sinusoidal wave contains both a vertex and a reversal point, making it possible to directly read off amplitude A of the time-dependent signal which indicates the reflection strength of coating 30.

Depending on the phase position of time-dependent signal 22, it is also possible that the visible portion in the time window of length T has no vertex or reversal point. Nonetheless, it is always possible even in smaller time windows to adapt a sine curve having a known frequency to the visible portion of the curve so that a maximum of agreement is achieved. The amplitude of the adapting sine curve then indicates amplitude A of time-dependent signal 22 and accordingly the reflectivity of the radome coating.

Amplitude A or its square (corresponding to the reflected power) may be used as a measure of the reflection strength of the radome coating, and if this measure, after suitable time filtering if necessary, exceeds a specific threshold value, detection unit 32 emits a signal that indicates the blinding of the sensor system.

If the power emitted by antenna 10 is varied over time, the threshold value must be adjusted accordingly.

In the example described here, it was assumed for the sake of simplification that only a single antenna element 10 that is used for both transmitting and receiving is present. In a bistatic antenna concept, different antenna elements are used for transmitting and receiving. In that case, both antenna elements jointly make up the "antenna" within the meaning of this application.

In practice, the radar sensor system will usually have several antennas situated next to one another, the radiation of which is bundled by the radar lens in slightly different directions, so that a greater locating area is scanned in the horizontal and a determination of the azimuth angle of the located objects is also made possible. However, since the radiation of each individual antenna is influenced by coating 30 on the total surface of the radome, it is in principle sufficient if detection unit 32 only evaluates the signal of a single antenna. Optionally of course, the signals of a plurality or of all antennas may be evaluated.

In the example shown here, detection unit 32 accesses time-dependent signal 22 in digitized form, i.e., signal 22 is represented by a digital data record, which with suitable temporal resolution, indicates the change of the elevation during the duration of the modulation ramp. In a modified specific embodiment, it is, however, also conceivable that detection unit 32 evaluates the analog mixed product directly.

What is claimed is:

1. An FMCW radar sensor system, comprising:
    an antenna covered by a radome;
    a mixer for mixing a frequency-modulated transmission signal with a signal received by the antenna;
    a recording device for recording the mixed product of the mixer as a time-dependent signal;
    a calculating device for calculating the spectrum of the time-dependent signal; and
    a detecting device for detecting a reflecting coating on the radome;
    wherein the detecting device for detecting the reflecting coating is configured for analyzing the time-dependent signal and for determining the extent of the reflection on the radome based on the amplitude of this signal.

2. The radar sensor system of claim 1, wherein a duration of a modulation ramp of the transmission signal and the modulation amplitude of this transmission signal is adapted to the distance between the antenna and the radome so that the period of the time-dependent signal, which is obtained by reflection on the coating, amounts to no more than eight times the modulation duration.

* * * * *